(12) United States Patent
Jans et al.

(10) Patent No.: US 7,072,913 B2
(45) Date of Patent: Jul. 4, 2006

(54) METHOD, SYSTEM AND COMPUTER PROGRAM FOR EXECUTING HOT MIGRATE OPERATION USING MIGRATION PLUG-INS

(75) Inventors: Jozef Theodorus Johannes Maria Jans, Maasbree (NL); Richard Michel De Groot, Venlo (NL)

(73) Assignee: OCÉ-Technologies B.V., Venlo (NL)

( * ) Notice: Subject to any disclaimer, the term of this patent is extended or adjusted under 35 U.S.C. 154(b) by 474 days.

(21) Appl. No.: 10/166,370

(22) Filed: Jun. 11, 2002

(65) Prior Publication Data

US 2002/0188625 A1 Dec. 12, 2002

(30) Foreign Application Priority Data

Jun. 11, 2001 (EP) ................................. 01202218

(51) Int. Cl.
*G06F 17/30* (2006.01)
(52) U.S. Cl. .................................................... 707/203
(58) Field of Classification Search ................. 707/203
See application file for complete search history.

(56) References Cited

U.S. PATENT DOCUMENTS

| 5,359,730 | A | * | 10/1994 | Marron ....................... 717/169 |
| 5,557,785 | A | * | 9/1996 | Lacquit et al. ............ 707/104.1 |
| 5,625,804 | A | * | 4/1997 | Cooper et al. ................. 703/26 |
| 5,950,201 | A | * | 9/1999 | Van Huben et al. ........... 707/10 |
| 6,167,405 | A | * | 12/2000 | Rosensteel et al. .......... 707/102 |
| 6,233,586 | B1 | * | 5/2001 | Chang et al. ............ 707/103 R |
| 6,308,178 | B1 | * | 10/2001 | Chang et al. ................ 707/100 |
| 6,654,950 | B1 | * | 11/2003 | Barnishan .................... 717/136 |

FOREIGN PATENT DOCUMENTS

| EP | 0 738 980 A2 | 10/1996 |
| EP | 1 091 305 A1 | 4/2001 |

* cited by examiner

*Primary Examiner*—Wayne Amsbury
(74) *Attorney, Agent, or Firm*—Birch, Stewart, Kolasch & Birch, LLP (57) ABSTRACT

A method, system and computer program for executing a hot migration operation are provided. A hot migration operation is executed from a first version of a service using a first data model, to a second version of the service using a second data model that is modified with respect to said first data model. A service comprises a client application, a data manager and a data repository. The migrate operation is effected on a server facility that accommodates multiple processes to be running in parallel. Second version client applications, a second version data manager operating according to the second data model, and a second version data repository arranged according to the second data model and cooperating with the second version data manager are installed. The first and the second version data managers are provided each with a migration plug-in. The method uses an incremental roll-over process, wherein, in successive steps, data is converted from the first version data repository to the second version data repository by the migration plug-in until all data are converted and thereafter, any old version of the service is removed.

21 Claims, 7 Drawing Sheets

Name: | John Smith |     N version     101

---

Firstname: | John     N+1 version
Lastname: | Smith     102

FIG. 1

Title: | Great Expectations     N version     201

---

Title: | Great Expectations     N+1 version
Pages: | 176     202

METHOD, SYSTEM AND COMPUTER PROGRAM FOR EXECUTING HOT MIGRATE OPERATION USING MIGRATION PLUG-INS

The present application claims, under 35 U.S.C. §119, the priority benefit of European Patent Application No. 01202218.2 filed Jun. 11, 2001, the entire contents of which are herein fully incorporated by reference.

BACKGROUND OF THE INVENTION

1. Field of the Invention

The invention relates to a method for executing a hot migrate operation through an incremental roll-over process that uses migration plug-in means for conversion during an upgrade transition, a system being arranged for implementing such a method, and a computer program implementing such a method on a carrier such as a storage medium or electrical signal.

2. Discussion of the Related Art

In general, during a migration or upgrading/downgrading of a service or application to a different version, the user functionality of an application will change and this change will be evident to the user. The appearance of such migration to the user has in the related art been such that either the application would be rendered inoperable or inaccessible for some time, or even worse an actually running client session would become invalidated. To the user in question, such would appear as a malfunction of the application itself or some underlying technology.

The present inventors have recognized that in many circumstances such inoperability would be considered unacceptable and have invented the present invention which overcomes problems and limitations associated with the related art.

SUMMARY OF THE INVENTION

The present inventors have recognized that the advantages of an incremental procedure may be able to "hide" as it were, the upgrading or migrating from user entities that are "running behind" in the migrating with respect to others that "have advanced already", and vice versa, hiding that the migration is still incomplete from user entities that have advanced already, with respect to other such entities that are still running behind. In consequence, among other things, it is an object of the present invention to keep the entries that have been converted separate from those that have not and yet to execute the migrating in a "rolling-over" manner. It is another object of the present invention to provide an application-related data repository that will remain available throughout, in particular, even during a plurality of successive sessions.

According to one of its aspects of the invention, a method for executing a hot migrate operation from a first version of a service using a first data model, to a second version of the service using a second data model that is modified with respect to the first data model, the service comprising a client application, a data manager and a data repository, the method comprises the steps of installing at least one second version client application; installing a second version data manager operating according to the second data model; and installing a second version data repository arranged according to the second data model and cooperating with the second version data manager, wherein the second version data manager is provided with a first migration plug-in and in that an incremental roll-over process is effectuated, and wherein in successive steps, data is converted from a first version data repository associated with the first version of the service to the second version data repository by the first migration plug-in until all data are converted and thereafter, a first version client application associated with the first version of the service becomes removable.

In the context of the present invention, a service can represent a computer program, a database system, an operating system, an e-service, or a mixture or combination of these. Furthermore, each of these is being taken in an appropriate scope wherein it would be operative in the ambit of the hardware and software as hereinafter described by way of preferred embodiments. The context of the present invention is such where the use of the application on the one hand, and the maintaining of the application on the other, will generally be separated in time and/or in space, and/or where it would be difficult to schedule a general downtime interval for the complete system that would be sufficiently long to effect the overall migration.

Now, the invention will hereinafter be disclosed with reference to particular embodiments. In principle however, the invention may be used on a wide scale. A particularly advantageous embodiment of the invention can be realized through the use of object-oriented programming.

BRIEF DESCRIPTION OF THE DRAWINGS

These and further aspects and advantages of the invention will be discussed more in detail hereinafter with reference to the disclosure of preferred embodiments, and in particular with reference to the appended figures, wherein.

DETAILED DESCRIPTION OF PREFERRED EMBODIMENTS

Figure 1:
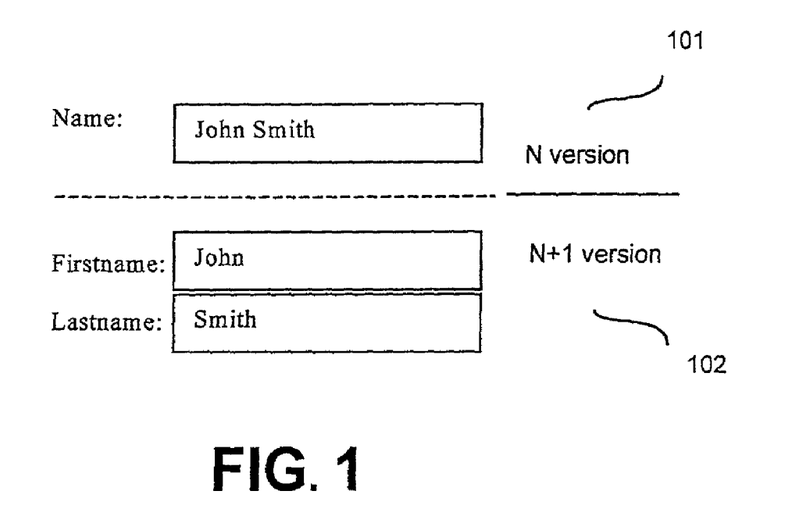
FIG. 1 shows an example of two data versions in a first field of use.

FIG. 1 illustrates an example of two versions of a service in a first field of use (e.g., accessing customer-related data in an online retail shop) to which the present invention is applicable. As shown in FIG. 1, in the old version (top), a customer's name has been available as a single attribute. In the new version (bottom), the customer's first and last names will be available separately. When no downtime is necessary for effecting the migration (i.e., switching from an N version to an N+1 version of the application or service), the shop can remain online even in the interval during which the new version will be introduced.

Figure 2:
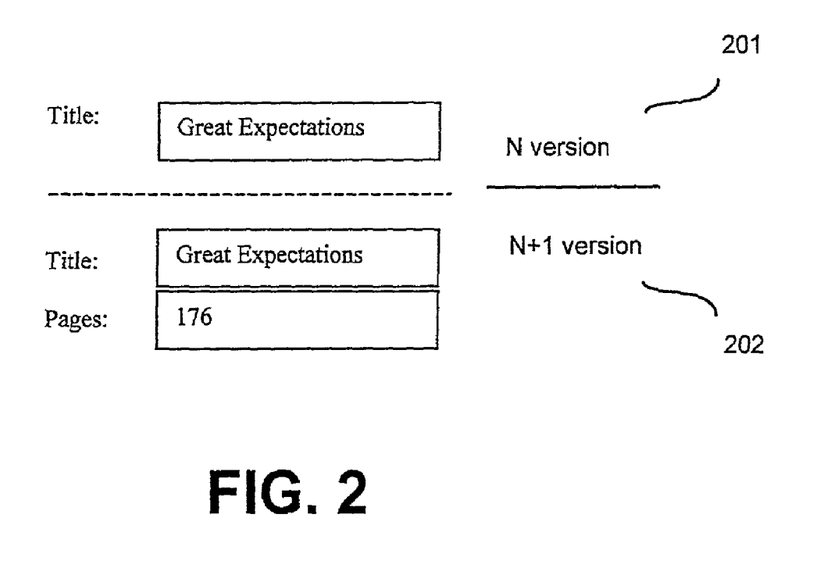
FIG. 2 shows an example of two data versions in a second field of use.

FIG. 2 illustrates an example of two versions of a service in a second field of use (e.g., in a library) to which the present invention is applicable. The old library application N version (top) has not maintained information concerning the size of the various books. In the new N+1 version of the application (bottom), each book title has a number-of-pages attribute. By using the present invention's teachings, the library application can remain online during the migration that introduces the attribute extension.

Likewise, an Enterprise Resource Planning system can combine various ones of its respective databases into a single one while remaining online using the teachings of the present invention, so that the actual production will not be interrupted or misguided. Likewise, a conversion to a new monetary currency (such as the conversion to EUROs as per Jan. 1, 2002), whilst using the present invention would not need synchronization among the various client banks. In fact, various banks may keep using the old currency in their operations even when other banks will have switched over to the new currency already. In still another example, likewise, an insurance company may offer a certain insurance policy to a particular customer, whilst in the meantime migrating to a new version of the insurance program in question. Nevertheless, the application according to the present invention will still accept the old data, as they will be entered by a user person. Obviously, this kind of migrating would represent an improved service level. There are numerous other examples to which the present invention can be applied.

Figure 3:
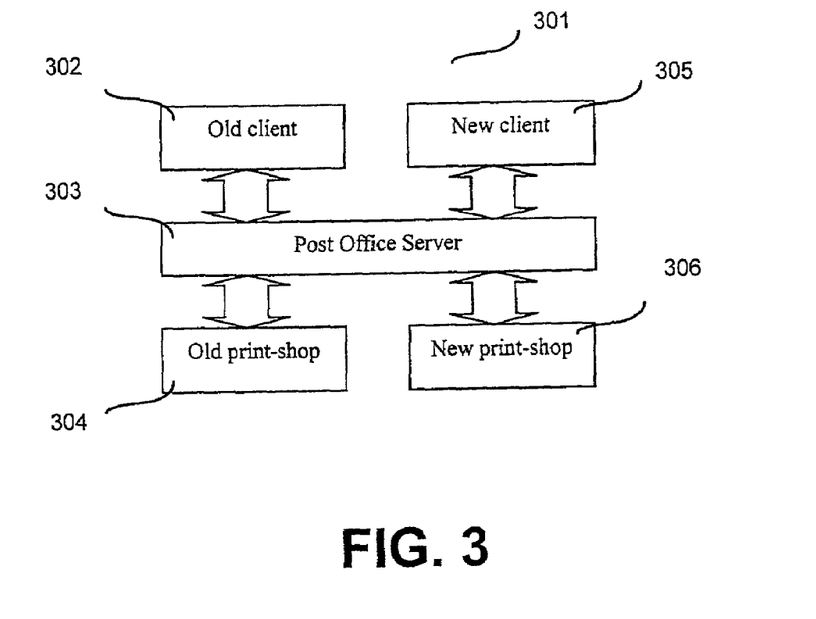
FIG. 3 shows an example of a set-up in a third field of use.

FIG. 3 illustrates a set-up in a third field of use (i.e., for the printing of documents via the Internet) to which the present invention is applicable. As an example, a print service system 301 comprises an old application 302 for submitting printjobs, a Post Office Server 303 for receiving the printjobs and forwarding them to the old Print Shop 304. The old print service system will accept only a single document for each printing order. On the other hand, a new print service system that includes an application 305 and a Print Shop 306 will accept multiple documents for a single print order. According to a related art, simultaneous upgrading of all those entities that may be located at various remote locations would not be possible and/or feasible. However, the introduction of the present inventive concept does away with the above requirement for synchronization among the various entities. In accordance with the present invention, old clients as well as old print shops will proceed to use the old paradigm until they will effectively change over to the new service while new and upgraded applications 305 will be able to use the new feature(s) immediately, even while still communicating with stations that have not yet migrated.

The present invention may be effected in a distributed environment. Most of the time, a distributed environment based on one or more platforms will be used.

Figure 4:
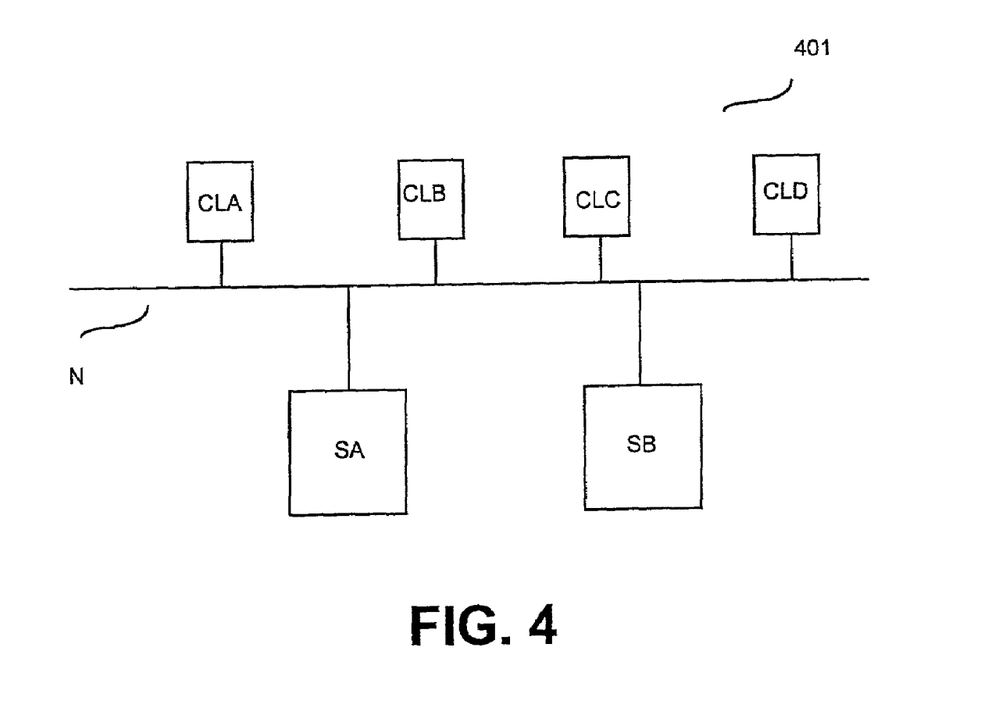
FIG. 4 shows a hardware embodiment for practicing the invention.

FIG. 4 illustrates an example of a hardware embodiment for practicing the invention. As shown, clients CLA, CLB, CLC, CLD are operatively coupled by way of a network N (which may be a LAN, Internet, or other interconnection scheme) interfaced to servers SA, SB. The clients will emanate user requests to the servers that may constitute a load balancing pool through implementing balancing concepts that are known in the applicable art. If applicable, the servers may in fact constitute a single server multiprocessing unit.

Figure 5:
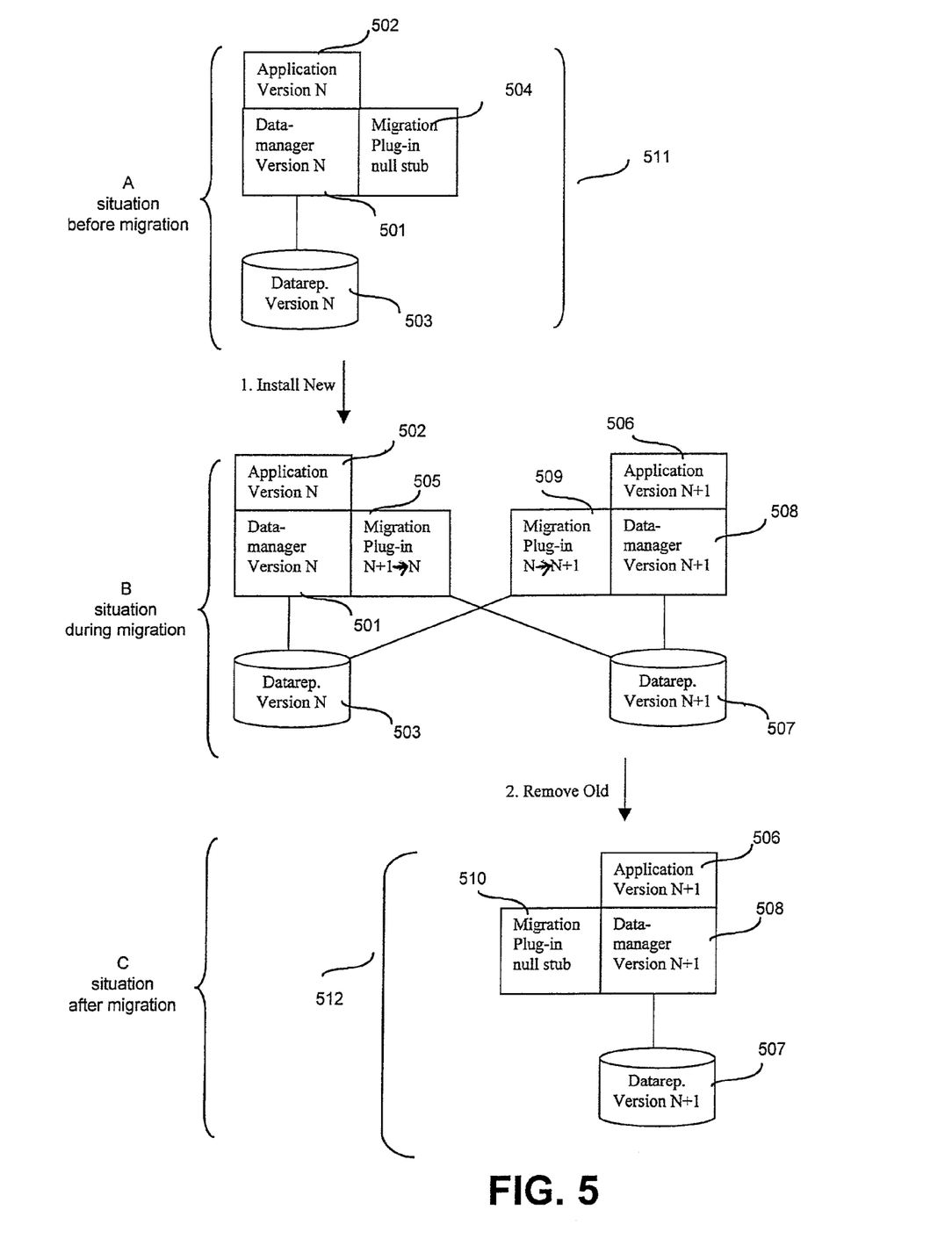
FIG. 5 shows the design concept of the present invention according to an embodiment of the present invention.

FIG. 5 illustrates generally the concept of the present invention. FIG. 5 shows in three parts A, B and C respectively the starting situation, the situation during migration, and the resulting situation. Same items in any of parts A, B and C of FIG. 5 are indicated by the same reference numbers.

The top part A in FIG. 5 illustrates the initial situation, wherein the version N of the application (502) is operative and this application runs normally. Using the data manager (501) of the applicable version N, the application (502) will access the data repository (503) of the associated version. As only an illustration of the broad deployment of the invention, the notions of application, data manager and data repository are mapped on corresponding notions for some exemplary fields of application. In this respect the term e-service has to be understood as a service made available via a public accessible network, e.g. internet, and offering a service such as: selling books, consultation of data like a phone book, translation services, printing services, etc.

Fields of application where the method according to an embodiment of the invention can be advantageously applied may be, inter alia: operating systems (1), word processing (2), databases (3), and e-services (4). In respective cases, the client application is a file system browser (1), a word-processing application (2), a database application (3), and a web site of a service provider (4). The respective data managers are in such cases respectively a file system (1), a specific command set like 'load', 'save', 'format', etc. (2), a database engine (3), and a program to convert user entered data towards a particular data model (4), where the data repositories are respectively a disk (1), a file system (2), a file system (3) and an enterprise resource planning system supporting the particular data model (4). In all cases the data manager (501) will manage the accessing by the application (502) of the data repository (503). The migration plug-in null stub (504) effects no processing functionality, apart from the necessary interfacing to the data manager.

Although represented as a single entity, the application (502) may in fact be running on multiple processes in parallel or even on multiple processors located at a single location or at a plurality of remote locations. The same may apply to the various applications in parts B and C of FIG. 5. Further, it is noted that an application user that accesses the service via the client application may be a human user or a program (e.g. an agent).

Part B of FIG. 5 illustrates the situation during the migration from version N to version N+1 of an application. On the one hand, such migration may be effected incrementally in response to user actions. In contradistinction, another drive mechanism would be a complete migration in one step as invoked by the overall system. The latter would be effected by first retrieving all data and storing those data in the new repository. Now, the left and right halves of part B of FIG. 5 are respectively accessible to an application that is relatively "running behind" and still uses version N of the client application (502), and to another application user that is relatively "advanced", and already is using version N+1 of the client application (506). In addition, the data repository has already been made available both in version N+1 (507) and is also still maintained in version N (503). This may mean that part of the data repository is available in the new version, whilst part of it is still available in the old version, the two versions combined being able to accommodate the total data.

The converting of the data from the data repository or parts thereof is generally effected as a background process that is invisible to the users. For accessing the data repository or part thereof in the same version as the application, the latter would of course need no conversion between the data manager and the associated data repository, as indicated in FIG. 5 by a straight connecting line. In this case, i.e. situation B, the migration plug-in null stub (504) has been replaced by a migration plug-in N+1→N (505) at left.

A counterpart situation to the one discussed here above would prevail at the right hand side of FIG. 5, where both the application Version N+1 (506) is accessible to a user, and furthermore a data repository or part (507) associated with the N+1 version is operative. This situation will require a data manager version N+1 (508) and a migration plug-in N→N+1 (509) as illustrated. The migration plug-in N+1→N (505) accesses data in the data repository version N+1 (507) and interacts with the data manager version N (501) to provide the accessed data to the manager (501). The migration plug-in N→N+1 (509) accesses data in the data repository version N (503) and interacts with the data manager version N+1 (508) to provide the accessed data to the manager (508).

The bottom part C of FIG. 5 illustrates the situation where all of the users and all of the data repositories have been converted to version N+1. When no "old version" (version N) data repository part need any longer be accessed by the newer version user, the existing migration plug-in will be replaced by a migration plug-in null stub (510). In the above, the users will generally experience either no downtime at all, or only during such brief instants necessary for the installing and uninstalling of the migration plug-ins (505, 509). It is remarked that it is possible to start a further upgrade to a version N+2 even before a migration to Version N+1 will be completed. Such embodiment would require a plug-in that iterates over multiple migration plug-ins for the various versions in FIG. 5, part B, which can be implemented according to the composite design pattern known from "Design Patterns: Elements of reusable object oriented software", Erich Gamma et al., ISBN 0-201-63361-2 1995, Addison Wesley Longman, Inc.

A particularly advantageous procedure of the present invention will be as follows. When a new application N+1 needs to retrieve data, its data manager (508) first tries to retrieve the data in question from the old version N data repository (503) via its plug-in (509). If the data is found indeed, the plug-in (509) will convert this data to the version N+1 format, store it in the version N+1 data repository (507), and then remove it from the version N data repository (503). Thereafter, or if the data is not found in the old version data repository, the data manager (508) will retrieve the converted data from the version N+1 data source or repository (507). Likewise, if the old application(s) (502) retrieve data, its data manager (501) first tries to retrieve the data in question from the old version data repository (503). If the access happens to be unsuccessful, the data manager (501) uses its plug-in (505) to retrieve the data from the new version N+1 data repository (507). If found, the data is converted for use, but is not stored in the version N data repository (503). Writing data will be preferentially executed to the own version of the data repository. At a certain later instant, when hardly any application user or none at all will be working anymore with the old version, the old application will be shut down, but the old data repository will be kept available for the new version application's plug in. The new application's migration plug-in (509) will then force a migration of all remaining data in the old version data repository (503) to the new version data repository (507).

Thereupon, the migration plug-in (509) will be replaced by the null stub (510) and the old data repository (503) will be removed.

For the description of the system according to the invention, the object-oriented model will be used; however, other model types can be used also. This means that where appropriate the invention will be described with reference to classes and objects instantiated from these classes. An object can be envisaged as a container of data and this data can be accessed only via methods provided by the object. A persistent object is an object that is saved and restored automatically upon exiting and starting of an application.

Figure 6:
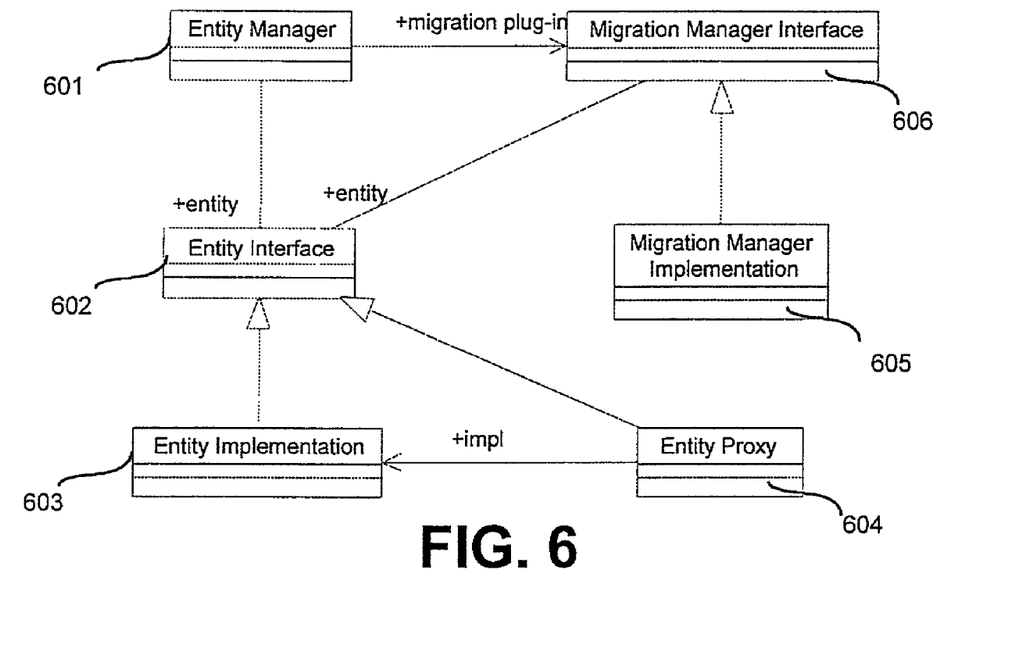
FIG. 6 shows, as a first UML diagram, an example of a Class diagram according to the present invention.

FIG. 6 illustrates, as a first Unified Modelling Language (UML) diagram, a class diagram according to an embodiment of the present invention. By itself, UML is a well-known modelling language in software generation procedures, and in consequence, would not warrant a further extensive discussion herein. A class diagram shows relations between classes involved. Block 601 represents the entity manager class, and as such, it is part of the data manager. In respect of the art under consideration, an entity is an identifiable (addressable) information object. For the exemplary fields of application given before, i.e., operating systems, word processors, databases and e-services, the entities are respectively: files and directories, parts of a document and fonts etc; a table or a record; and articles in the shop, payment conditions, type of erp, etc. The set of all entities each time defines the state of the system. Entities make up the content of the data repository. Disparate types of entities may coexist. The Entity Manager, as part of the data manager, gives the client application access to the data repository (e.g. select a person). It manages updates (e.g. additions, deletions, modifications, etc.) of entities in the data repository.

Block 602 represents the entity interface, i.e. it declares the methods and semantics for entities. The association between Entity Manager and Entity Interface indicates that the Entity Manager can call methods provided by the Entity Interface. In case of a database system, methods may be getName( ) and setName( ). Block 603 represents the Entity Implementation for effectively realizing Entity Interface 602. In this way, the implementation is decoupled from its interface so that the actual implementation is a component that easily may be exchanged for another one.

Block 604 represents the Entity Proxy for effectively realizing Entity Interface 602. A proxy is a well-known design pattern in software engineering (see "Design Patterns: Elements of reusable object oriented software", Erich Gamma et al., ISBN 0-201-63361-2 1995, Addison Wesley Longman, Inc.).This Entity Proxy takes care that the old application 'sees' the old Entity Interface, however with the new Entity Implementation already under it. The role of migration plug-in illustrated already in the earlier figures is realized by the Migration Manager Implementation class 605 and the Migration Manager Interface class 606. The Migration Manager Interface class 606 hides the actual implementation realized in the Migration Manager Implementation class 605. The interface provides, e.g., the methods such as migrateCollection( ) and migratePrimaryKey( ) for migrating complete collections of entities and single entities respectively.

Figure 7:
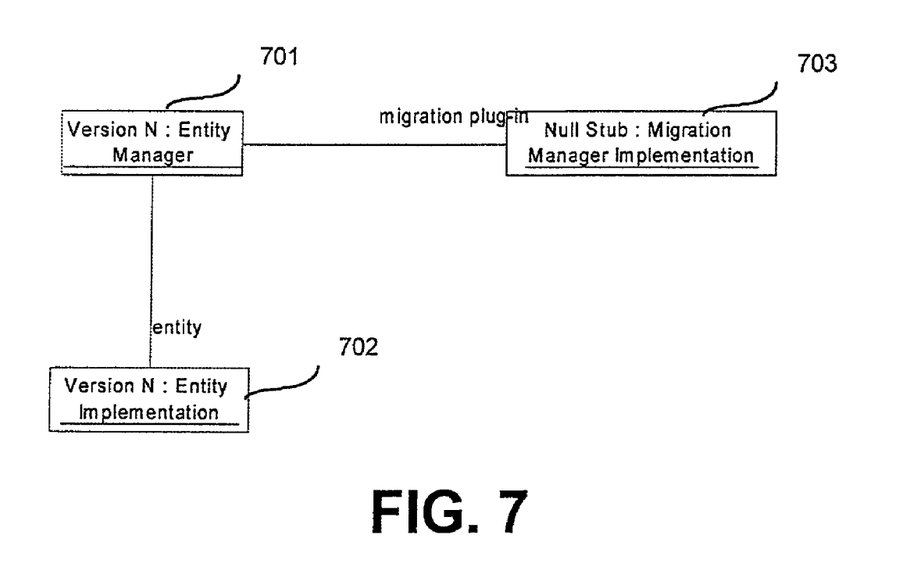
FIG. 7 shows an example of an initial Version collaboration according to an embodiment of the present invention.

FIG. 7 illustrates, in a UML collaboration diagram, an example of collaboration between objects instantiated from the classes shown in FIG. 6 for Version N collaboration corresponding with part A of FIG. 5 according to an embodiment of the present invention. In this elementary configuration, block 701 represents the Entity Manager of Version N that has an association with block 702, the Entity Implementation of Version N. Also the Entity Manager 702 has an association with block 703, the Migration Manager Implementation Null Stub. It is noted that the data manager will accommodate a plurality of entity managers in case a plurality of entity types are present in the data model.

Figure 8A:
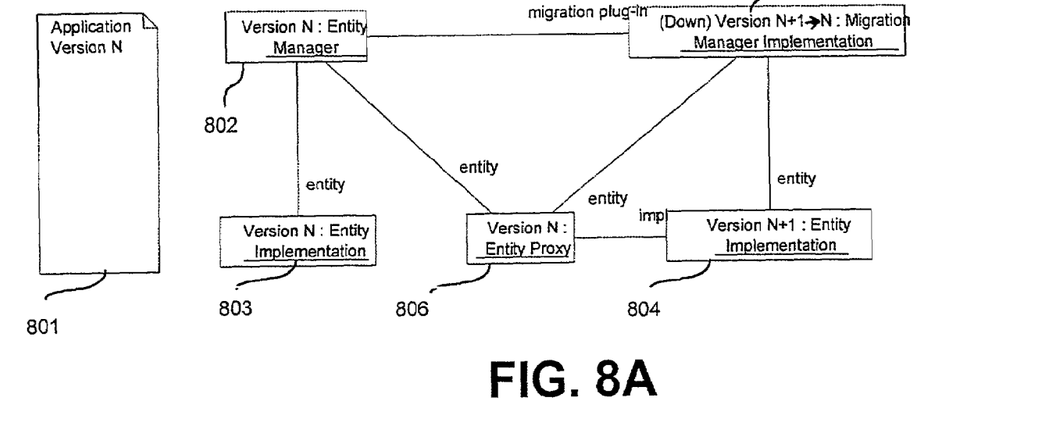
FIGS. 8A and 8B show examples of collaboration during a subsequent migration according to an embodiment of the present invention.

FIG. 8A illustrates an example of the collaboration during transition (part B of FIG. 5) from the perspective of a Version N Application 801. Blocks 802 and 803 correspond respectively to blocks 701 and 702 in FIG. 7. Block 804 represents the Entity Implementation Version N+1. In contradistinction to FIG. 7, the version N Entity Manager 802 has now an association with the Down Version Migrator (block 805). In this way, entities that can not be found in version N data repository are retrieved from version N+1 Data Repository and via the migration manager that converts the retrieved N+1 version data to the version N format. The version N+1 Entity Implementation 804 is accessed by the version N Entity manager 802 via the Entity Proxy 806.

Figure 8B:
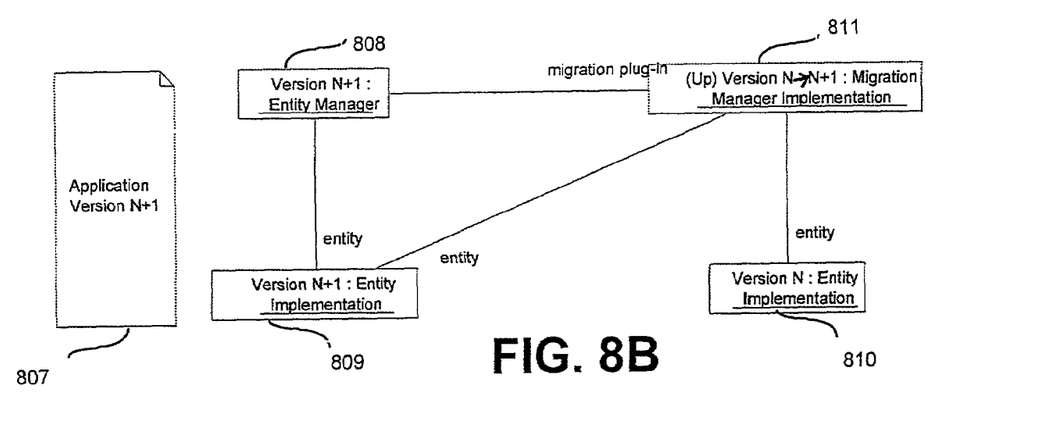

FIG. 8B illustrates an example of the collaboration during transition (part B of FIG. 5) from the view point of Version N+1 Application 807. Blocks 808 and 809 correspond respectively to blocks 701 and 702 in FIG. 7. Block 810 represents the Entity Implementation Version N. In contradistinction to FIG. 7, the Entity Manager 808 has now an association with the Up version of the Migration Implementation 811. In this way, care is taken that version N entities are converted to version N+1 entities upon retrieval from the N version Data Repository.

Figure 9:
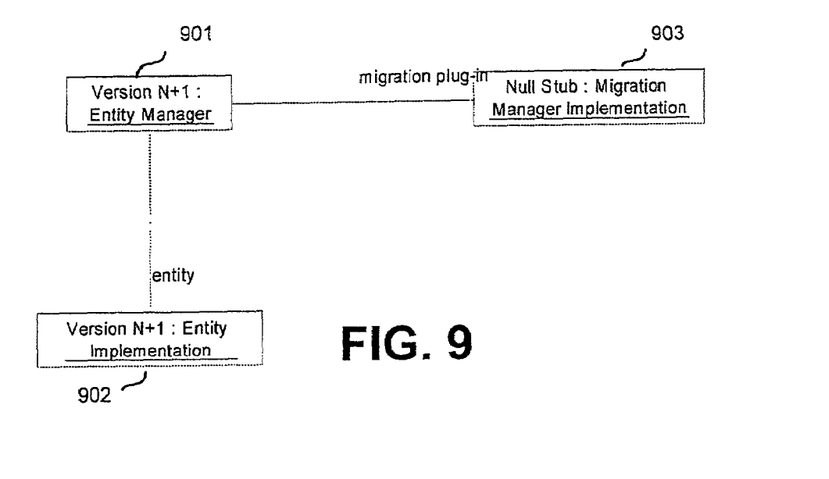
FIG. 9 shows an example of a final Version N+1 collaboration according to an embodiment of the present invention.

FIG. 9 illustrates, in a UML collaboration diagram, an example of Version N+1 collaboration corresponding with part C of FIG. 5 according to an embodiment of the present invention. In this elementary configuration, block 901 represents the Entity Manager of Version N+1 that has an association with version N+1 entities represented by block 902. The migration plug-in is now actually the Null Stub 903.

Figure 10:
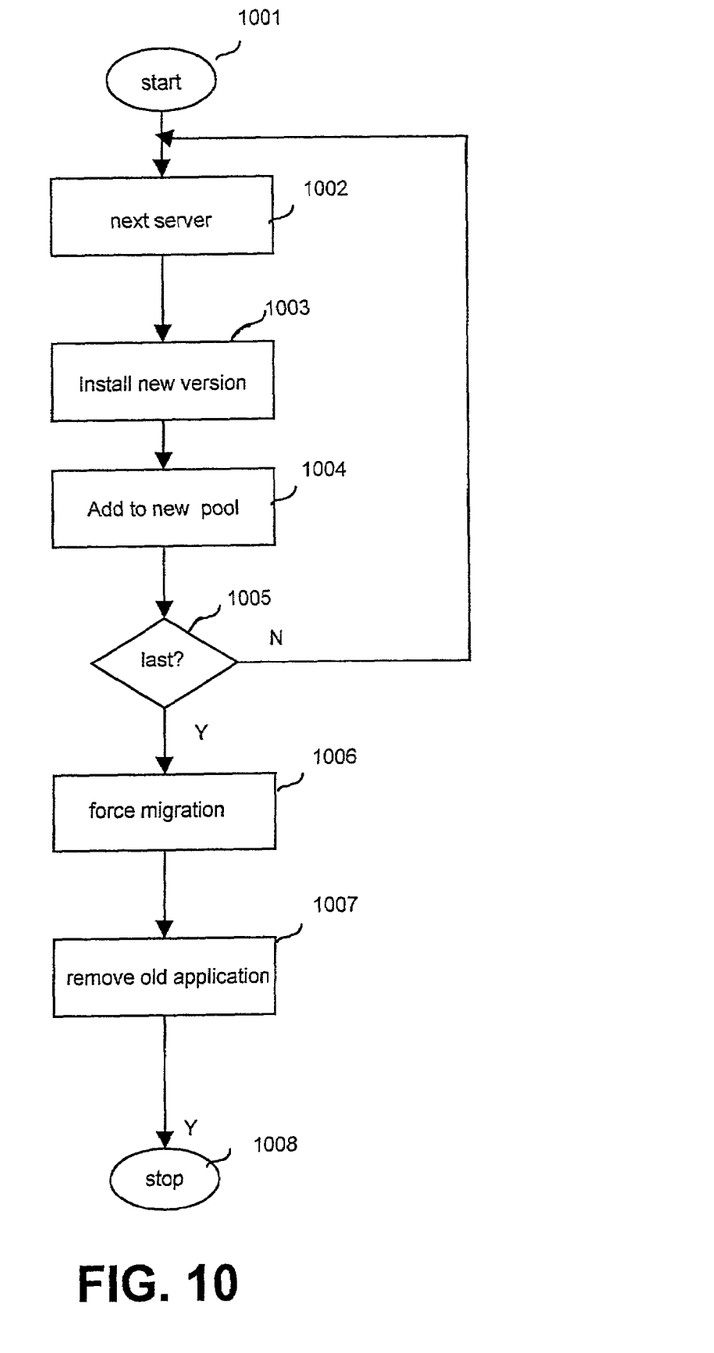
FIG. 10 shows an applicable flow chart for use with a load balancing pool according to an embodiment of the present invention.

FIG. 10 illustrates an applicable flow chart for use with a load balancing pool according to an embodiment of the present invention. In block 1001, the necessary hardware and software facilities are assigned. At this point, the earlier (N) version is running throughout. When the hot upgrade starts, in block 1002, one server is taken out of the load balancing pool in such a manner that current client sessions that may be running on it are allowed to finish properly. Subsequently, this server will not be allowed to start any new client sessions. When all client sessions on this particular server will have ended, or after a certain time-out period will have expired, the new application version will be installed on the server in block 1003. The above time-out period may be necessary if certain sessions may go on to delay the transition for an unacceptably long time. Migration plug-ins are then installed both in the old and in the new application version. These plug-ins will manage the persistent data in a consistent manner while both application versions will be running thereafter. Generally, the logic of the old application version will be preserved, but new user requests for the old application version can no longer be issued to this server. Next, in block 1004, the server in question is added to a new load balancing pool. The system router facility will distribute client requests over the old and new load balancing pools, respectively. Once the router facility will have routed a request from a particular client to the new load balancing pool, it must continue to do so. Requests for the old application should not be forwarded to the new load balancing pool.

In block 1005, the system checks whether the last server facility has been transferred to the new load balancing pool. If negative (N), the process is repeated through the loop formed by the blocks 1002, 1003, 1004 and 1005. If positive (Y), the system in block 1006 forces a migration of all persistent data. During this period, actual client requests will be served concurrently using further on-demand migration wherever required. When ready, in block 1007, the old application Version is removed or uninstalled from the various servers. At this point, the upgrade to the new Application Version N+1 is complete, so that in block 1008, any redundant facilities may be relinquished again to serve other purposes.

Figure 11:
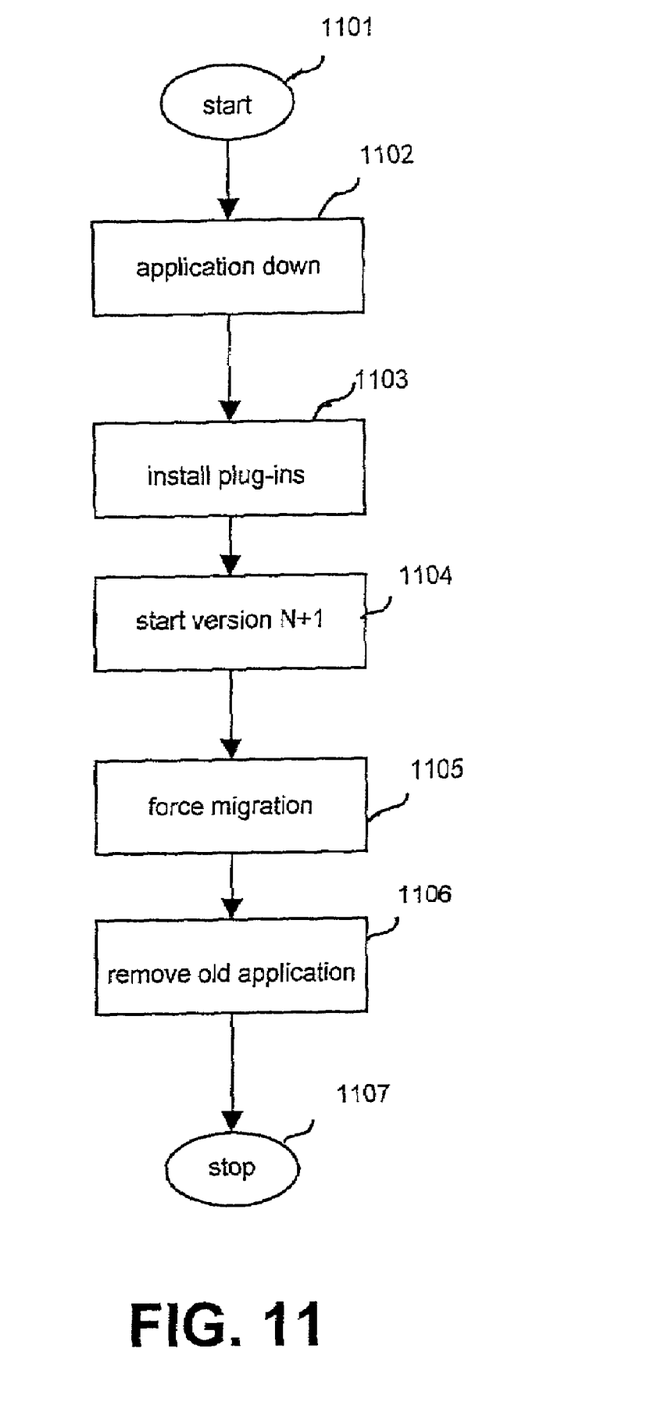
FIG. 11 shows an applicable flow chart for use with a single server according to an embodiment of the present invention.

FIG. 11 illustrates an applicable flow chart for use with a single server according to an embodiment of the present invention. In block 1101, the necessary hardware and software facilities are assigned. At this point, the earlier (N) version is running throughout. In block 1102, the old application version N is taken down temporarily, but the server is maintained operational. In block 1103, the new application version N+1 is installed on the server, e.g., old web pages are removed. Migration plug-ins are installed both on the old application version and on the new version, cf. FIG. 5, part B. These plug-ins will manage persistent data in a consistent manner while both application versions are running. Note that the logic for the old application version is preserved, although requests for the old application version cannot be effectively issued to the server anymore, because the old web pages will be no longer available.

In block 1104, the new application version N+1 is started. Next, in block 1105, a forced migration of the persistent data is initiated. During this migration, client requests will be served in a concurrent manner, using on-demand migration whenever necessary. Finally, in block 1106, the old application version N is removed from the server. At this point, the upgrade to the new application version N+1 is complete, so that in block 1107 any redundant facilities may be relinquished again to serve other purposes.

The present invention may be used advantageously with all Internet applications that must remain operational continuously. Upgrading requires no actions by end-users. The new version will automatically propagate to the end users.

It will be appreciated by those skilled in the art that the invention is not restricted to the details of the described embodiments. For example, the present invention is equally applicable to down-migrate a service (e.g., switching from N version to N−1 version). Such situation may arise for example when a new version appears to be not yet stable and a return to the previous version is required. The present invention can be implemented using known hardware and/or software. Any known computer programming language readable by a computer can be used to implement the invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A method for executing a hot migrate operation from a first version of a service using a first data model, to a second version of the service using a second data model that is modified with respect to the first data model, the service comprising a client application, a data manager and a data repository, said method comprising the steps of:

installing at least one second version client application;

installing a second version data manager operating according to the second data model; and installing a second version data repository arranged according to the second data model and cooperating with the second version data manager, wherein the second version data manager is provided with a first migration plug-in and in that an incremental roll-over process is effectuated, wherein in successive steps, data is converted from a first version data repository associated with the first version of the service to said second version data repository by the first migration plug-in until all data are converted and thereafter, a first version client application associated with the first version of the service becomes removable, and wherein the first version of the service is controlled to retrieve data from the first version data repository, but if unsuccessful, to retrieve and convert data from the second version data repository without storing the data in the first version data repository, where said conversion takes place using a second migration plug-in coupled to a first data manager associated with the first version of the service.

2. A method as claimed in claim 1, wherein the second version of the service is controlled to retrieve and remove data from the first version data repository, and thereupon to convert and store these data to the second version data repository.

3. A method as claimed in claim 1, wherein the incremental roll-over process is concluded by shutting down the first version of the service but maintaining first version data available to the first migration plug-in for having thereby executed a forced migration to the second version data repository.

4. A method as claimed in claim 1, wherein the incremental roll-over process is terminated when all data are migrated to the second version data repository, and thereafter the first migration plug-in is replaced by a null stub.

5. A method as claimed in claim 1, wherein the second version client application is available through a distributed network.

6. A method as claimed in claim 1, wherein said service includes a database service, a computer program, an operating system, an e-service, or a mixture or a combination thereof.

7. A method as claimed in claim 1, wherein said service is based on object-oriented programming.

8. A method as claimed in claim 1, wherein said service runs on a single server.

9. A method as claimed in claim 1, wherein said service runs on multiple servers in a first pool, wherein successive servers are relieved from client sessions, get a new application version installed, and are entered into a second pool for running the new application version, until all servers are contained in the second pool.

10. A method as claimed in claim 1, wherein said migration operation is forced.

11. A method as claimed in claim 1, wherein said migration operation is effected on demand.

12. A method as claimed in claim 1, wherein said first and second versions are N and N+1 versions, respectively.

13. A method as claimed in claim 1, wherein said first and second versions are N and N−1 versions, respectively.

14. A system for executing a hot migrate operation, comprising:

control means for executing a hot migrate operation from a first version of a service using a first data model, to a second version of the service using a second data model that is modified with respect to said first data model;

installing means for installing at least one second version client application, for installing a second version data manager operating according to said second version data model, and for installing a second version data repository arranged according to said second data model and cooperating with said second version data manager; and roll-over control means for converting in successive steps data from a first version data repository associated with the first version of the service to said second version data repository until all data are converted, wherein the roll-over control means includes a first migration plug-in coupled to the second version data manager, for accessing data in the first version data repository, and wherein the first version of the service is controlled to retrieve data from the first version data repository, but if unsuccessful, to retrieve and convert data from the second version data repository without storing the data in the first version data repository, where said conversion takes place using a second migration plug-in coupled to a first data manager associated with the first version of the service.

15. A system as claimed in claim 14, further comprising:

multiple servers that are server-wise taken out of service from a first pool, have their migration plug-ins installed, and subsequently are entered into a new pool, until all servers are converted.

16. A system as claimed in claim 14, wherein an incremental roll-over process is effectuated in the first migration plug-in and is terminated when all data are migrated to the second version data repository, and thereafter the first migration plug-in is replaced by a null stub.

17. A system as claimed in claim 14, wherein said service runs on a single server.

18. A system as claimed in claim 14, wherein said first and second versions are N and N+1 versions, respectively.

19. A system as claimed in claim 14, wherein said first and second versions are N and N−1 versions, respectively.

20. A computer program product embodied on a computer-readable recording medium, for executing a hot migrate operation from a first version of a service using a first data model, to a second version of the service using a second data model that is modified with respect to the first data model, the service comprising a client application, a data manager and a data repository, said computer program product comprising computer-executable instructions for:

installing at least one second version client application;

installing a second version data manager operating according to the second data model; and installing a second version data repository arranged according to the second data model and cooperating with the second version data manager, wherein the second version data manager is provided with a first migration plug-in and in that an incremental roll-over process is effectuated, wherein in successive steps, data is converted from a first version data repository associated with the first version of the service to said second version data repository by the first migration plug-in until all data are converted and thereafter, a first version client application associated with the first version of the service becomes removable, and wherein the first version of the service is controlled to retrieve data from the first version data repository, but if unsuccessful, to retrieve and convert data from the second version data repository without storing the data in the first version data repository, where said conversion takes place using a second migration plug-in coupled to a first data manager associated with the first version of the service.

21. A computer program product embodied on a computer-readable recording medium, for executing a hot migrate operation from a first version of a service using a first data model, to a second version of the service using a second data model that is modified with respect to the first data model, the service comprising a client application, a data manager and a data repository, said computer program product comprising computer-executable instructions for:

installing at least one second version client application;
  installing a second version data manager operating according to the second data model; and
  installing a second version data repository arranged according to the second data model and cooperating with the second version data manager,
wherein the second version data manager is provided with a first migration plug-in and in that an incremental roll-over process is effectuated,
wherein in successive steps, data is converted from a first version data repository associated with the first version of the service to said second version data repository by the first migration plug-in until all data are converted and thereafter, a first version client application associated with the first version of the service becomes removable, and
wherein the incremental roll-over process is terminated when all data are migrated to the second version data repository, and thereafter the first migration plug-in is replaced by a null stub.

* * * * *